United States Patent [19]

Gebauer et al.

[11] 4,053,659
[45] Oct. 11, 1977

[54] ADHERENT POWDER COATINGS ON A BASIS OF PVC COPOLYMERS

[75] Inventors: Peter Gebauer; Peter Unrath, both of Trotsdorf, Germany

[73] Assignee: Dynamit Nobel Aktiengesellschaft, Cologne, Germany

[21] Appl. No.: 441,787

[22] Filed: Feb. 12, 1974

[30] Foreign Application Priority Data

Feb. 17, 1973 Germany .............................. 2308202

[51] Int. Cl.² .......................... B05D 3/02; B05D 1/24
[52] U.S. Cl. ................................ 427/27; 260/45.75 S; 427/185; 427/195; 427/375
[58] Field of Search ................. 117/21; 260/45.75 S; 427/195, 185, 375, 27

[56] References Cited

U.S. PATENT DOCUMENTS

| 2,752,325 | 6/1956 | Leistner et al. | 260/45.75 S |
|---|---|---|---|
| 2,789,963 | 4/1957 | Hecker | 260/45.75 S |
| 3,525,760 | 8/1970 | Seki et al. | 260/45.75 S |
| 3,562,205 | 2/1971 | Richart | 117/21 X |
| 3,640,747 | 2/1972 | Richart | 117/21 |
| 3,655,616 | 4/1972 | Freeze et al. | 260/45.75 S |
| 3,665,024 | 5/1972 | Oakes et al. | 260/45.75 S |
| 3,674,737 | 7/1972 | Brecker et al. | 260/45.75 S |
| 3,716,568 | 2/1973 | Brecker et al. | 260/45.75 S |
| 3,810,868 | 5/1974 | Weisfeld et al. | 260/45.75 S |
| 3,887,728 | 6/1975 | Looman et al. | 427/185 |

Primary Examiner—Ronald H. Smith
Assistant Examiner—Shrive P. Beck
Attorney, Agent, or Firm—Burgess, Dinklage & Sprung

[57] ABSTRACT

Adherence of polyvinylchloride coatings to substrates such as metal, glass, and ceramics is improved by using as the coating composition a copolymer of polyvinylchloride admixed with monoalkyl-monyaryl, dialkyl, or diaryl tin bismercaptocarboxylic acid ester of polyvalent alcohol. The composition adheres directly to the substrate.

25 Claims, 1 Drawing Figure

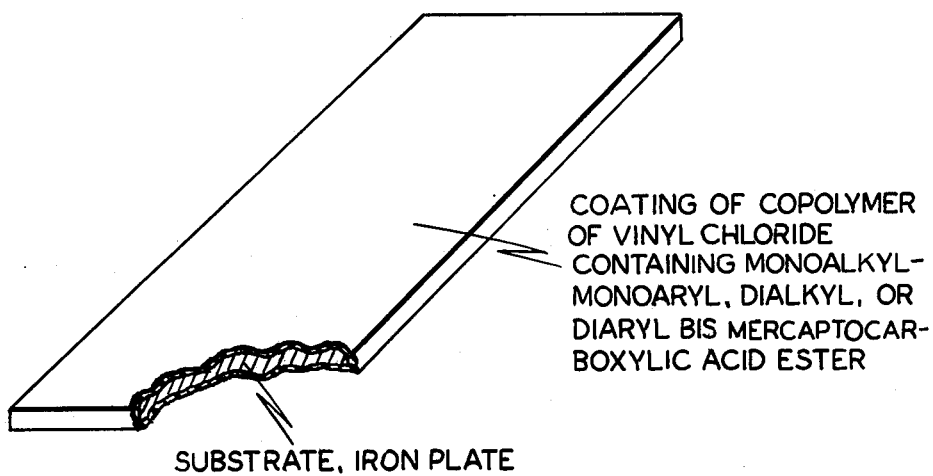

ADHERENT POWDER COATINGS ON A BASIS OF PVC COPOLYMERS

BACKGROUND

In polyvinyl chloride powder coating procedures, especially fluidized bed sintering and electrostatic powder coating, it has hitherto been necessary to use special adhesivizers for the achievement of good adhesion to the substrate. The procedure has generally been first to apply the liquid adhesivizing agent to the objects by immersion or by spraying. Then an airing is required for the evaporation of the solvents contained in the adhesivizer, and only thereafter can the adhesivizing agent be baked on. After these three operations the coating process can be performed.

It is sufficiently known from the literature and from patents that polyvinyl chloride and vinyl chloride copolymers may be stabilized against decomposition by the action of heat by such methods as the addition of organic tin compounds, such as for example dialkyl and/or diaryl tin maleinates and laurates, dialkyl and/or diaryl tin mercaptides, and dialkyl and/or diaryl tin bismercaptocarboxylic acid esters.

BRIEF DESCRIPTION OF THE DRAWING

A article composed of a substrate and a coating according to the invention is shown in the accompanying drawing.

THE INVENTION

It has now surprisingly been found that of these named compounds, which are used in a known manner for the thermal stabilization of PVC and its copolymers, alkyl and/or aryl tin bismercaptocarboxylic acid esters of polyvalent alcohols of Formula I, specifically, when mixed with vinyl chloride copolymers permit a self-adherent powder coating, in such a manner as to render unnecessary any previous application of known adhesivizers as "primers" to the surface being coated.

The subject matter of the invention is a method of producing self-adherent powder coatings of vinyl chloride copolymers on substrates of metal, glass, ceramic etc., which is characterized in that, without preliminary treatment of the substrates with adhesivizing agents, the said powdered polymers, which receive alkyl and/or aryl tin bismercaptocarboxylic acid esters of polyvalent alcohols in quantities of 0.5 to 5% of the weight of the vinyl chloride copolymers are applied to the surface and melted thereon.

The powder coatings produced by this method may be applied to the substrate materials by fundamentally any desired powder coating method, but preference is given to fluidized-bed sintering and electrostatic powder coating, or to the electrostatic fluidized-bed process wherein the other two processes are so combined that one or more annular or arcuate electrodes are mounted above the fluidized bed containing the suspended powder and produce an electrostatic charge of, for example, 50 to 110 kV. Metal sheets heated above the sintering temperature of the powder, at 250° to 400° C for example, are briefly immersed into the powder cloud without any post-sintering (in the fluidized-bed sintering process), or cold or preheated plates are provided by an electrostatic method with a layer of powder which is fused on by post-sintering at 180°–230° C (in the electrostatic powder coating process).

In these powders the predominant particle sizes are from 40 to 100 μm, for example, in electrostatic processes, and 40 to 300 μm, for example, in fluidized-bed sintering processes.

Preferably no external plasticizers, or only small amounts thereof, are contained in the powders.

Plasticizer-free vinyl chloride copolymers are quite decidedly preferred.

Additional subject matter is coating powders of vinyl chloride copolymers with contents of 0.5 to 5% of the weight of the polymers, of alkyl and/or aryl tin bismercaptocarboxylic acid esters of polyvalent alcohols.

In accordance with the invention, it now becomes possible to simplify substantially the powder coating procedure, since the additional application of adhesivizing components is eliminated together with the airing and baking thereof.

In the alkyl and/or aryl tin bismercaptocarboxylic acid esters of Formula I:

$$(R_2 R_2 Sn\, X_1\, X_2)_9 \quad (I)$$

which are contained in accordance with the invention, $R_1$ and $R_2$ represent identical or different radicals of the group alkyl radicals having 1 to 22, preferably 1 to 18 carbon atoms and aryl radicals having 6 to 15 carbon atoms, 9 beeing numbers of 1 to about 5, and $X_1$ and $X_2$ represent identical or different mercaptocarboxylic acid esters of polyvalent alcohols, e.g., radicals of the formulas:

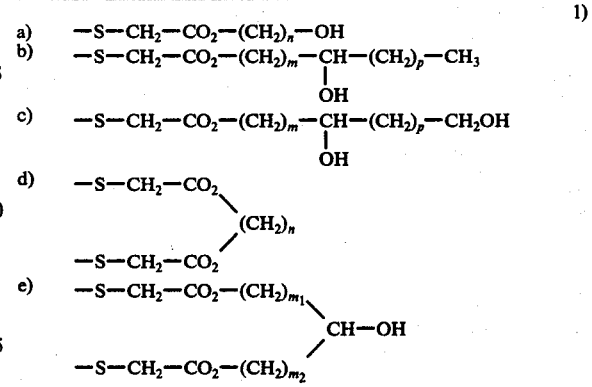

1)
a) $-S-CH_2-CO_2-(CH_2)_n-OH$
b) $-S-CH_2-CO_2-(CH_2)_m-CH(OH)-(CH_2)_p-CH_3$
c) $-S-CH_2-CO_2-(CH_2)_m-CH(OH)-(CH_2)_p-CH_2OH$
d) $-S-CH_2-CO_2\diagdown$
   $\qquad\qquad\qquad (CH_2)_n$
   $-S-CH_2-CO_2\diagup$
e) $-S-CH_2-CO_2-(CH_2)_{m_1}\diagdown$
   $\qquad\qquad\qquad\qquad CH-OH$
   $-S-CH_2-CO_2-(CH_2)_{m_2}\diagup$ wherein $n$ represents 2 to about 12, $m$ represent 1 to about 6, $p$ represents 0 to about 8 and $m_1$ and $m_2$ represent identical or different indices $m$, respectively, and the bifunctional radicals d) and e) may be bound to one tin atom as shown in formula II or each to two different tin atoms as shown in formula III $$R_1 R_2 Sn \qquad X \qquad (II)$$

and

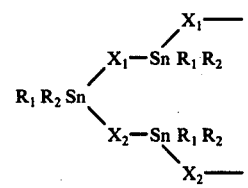

$$(III)$$

respectively in the case mostly are not more than 5 tin atoms in the molecule

Of the above-mentioned alkyl and/or aryl tin bismercaptocarboxylic acid esters, dialkyl tin dithioglycolic acid esters of polyvalent alcohols, of the formula

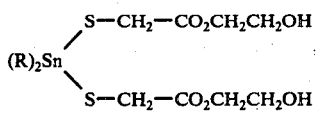

2)

and compounds of the formula

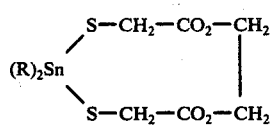

3)

having preferred radicals R in both cases of $C_4H_9$ to $C_8H_{17}$, are especially suited for the achievement of the effect that is the basis of the invention.

The above-named compounds are added, either alone or in mixtures with one another, to the said polymers, in amounts of 0.5 to 5%, especially 2 to 4%, of the weight of the vinyl chloride polymer.

For the preparation of the compound, first the vinyl chloride copolymers are thoroughly mixed with suitable modifiers, pigments, and one of the above-named compounds producing the effect of the invention. This may be done either in a slow-running free-fall mixer or in a high-speed mixer of conventional design. The mixing process if followed by the homogenization and plastification of the mixtures either with a roller mixer, for example, in the case of small batches, or with an extruder, for example, in the case of production, the extruder being equipped with either one or several screws. After this the compound, according to its plasticity, is granulated in strand, strip or head granulators to the particle sizes necessary for the grinding that follows. The granules are reduced to the grain size distribution required for the particular powder coating process. The compounds on which the effect of the invention is based undergo from the outset the process of the preparation of the powder and are thus an integral component of the composition.

The plastics used may be vinyl chloride copolymers, such as for example, VC-ethylene, VC-propylene, VC-butene, VC-vinylsilane, VC-vinylethylether or VC-vinylversatic esters (ester mixtures of pivalic acid derivatives formed by Koch's synthesis, of which one side chain is an alkyl group having 9 to 11 carbon atoms) and VC-vinylacetate, the content of the comonomer generally amounting to from 1 to 30%, preferably 2.5 to 6%, in the case of the olefins, 4 to 15% in the case of the vinyl silanes, and 5 to 25% in the case of vinyl acetate, of the weight of the copolymer. VC-propylene copolymers are preferred; the K values may amount, for example, to from 36 to more than 65, preferably from 40 to 56, depending on the particular polymer involved.

The adhesion test pursuant to DIN Standard 53,151 (criss-cross slashing) was used to demonstrate the effect of the invention. In addition to the testing procedure prescribed by the standard, severer variants were applied, namely a strip of of a unicoated adhesive tape (Tesa film) was adhered to the crosscuts and was then jerked away. Also, an Erichsen cupping was performed in the crosscut area in accordance with DIN 53,156, and then the Tesa strip test was performed. The rating was performed on the basis of the rating scale given in the Standard, GT 0 indicating the best rating and GT 4 the worst.

The test specimens were pieces made out of a variety of materials and having a smooth, degreased surface coated by the electrostatic powder coating method, and measuring 150 × 80 × 0.8 mm in the case of the EPC method and 150 × 80 × 1.5 mm in the case of the fluidized-bed sintering process. The thickness of the coating was approximately 80 to 100 μm in the case of the EPC method.

In the case of the test specimens coated by the fluidized-bed sintering process the criss-cross slashing test was inapplicable on account of the coating thickness of 200 to 500 μm commonly applied by this method, and therefore a cross-shaped cut was made and the specimen was then bent precisely at the intersection of the cuts, or two parallel cuts were made plus a transverse cut perpendicular thereto. In both cases a knife was used in attempting to lift off the coating in the area of the intersections.

Thus, the invention provides a process for producing an article coated with a vinyl chloride polymer which comprises forming a melted film on the surface of a substrate which is a body portion of the article, and hardening the film to form the coated article. The powder comprises a copolymer of vinyl chloride containing monoalkyl-monoaryl, dialkyl, or diaryl tin bismercaptocarboxylic acid ester of polyvalent alcohol in an amount sufficient to improve adhesion of the copolymer to the substrate.

The amount of time compound can be up to about 5 wt.%, based on the copolymer.

The tin compound is effective to improve the adhesiveness of the vinyl chloride polymer to substrates in general, and the improvement does not depend on the nature of the substrate.

The copolymer, containing the tin compound, is preferably applied to the substrate as a powder, as by electrostatic deposition or fluidized bed deposition. The particle size can be in the range of 20 -500 μ, preferably 30 -400 As mentioned above, for electrostatic deposition, the particle size is advantageously predominately in the range of 40 to 100 μm for fluidized bed deposition, advantageously predominately in the range of 40 to 300 μm.

Referring to Formula I above, $R_1$ and $R_2$ each represents alkyl of 1 to 22 carbon atoms, monoculear aryl, or alkyl substituted aryl of 6 to 15 carbon atoms, $X_1$ and $X_2$ each represents an S- residue of a thiocarboxylic acid ester of a polyvalent alcohol, with each $X_1$ and $X_2$ being bonded to the tin atom through the S atom thereof, with the proviso that $X_1$ and $X_2$ can be bonded together through carbon atoms of the alcohol residues to form a ring, e.g. as in Formulas 1(d), 1(e), and 3 above. The said bonding is by single, direct carbon to carbon bonds.

The polyvalent alcohols can be primary, secondary, or tertiary alcohols, and any combination thereof. The number of carbon atoms in the alcohols is 2 -24 preferably 2 -20.

In the copolymer, the vinyl chloride residues ($-CH_2CHCl-$) are 99 -20 wt.%, preferably 97.5 -94 wt.% of the copolymer.

The composition can include copolymer of vinylacetate and and ethylenically unsaturated monomer of 2 -4, preferably 2 –3 carbon atoms. The vinyl acetate content therein being of 28 to 49 wt. %. The other monomer can be monoethylenically unsaturated. Desirably, it is ethylene, as in Example 10 below. The vinylacetate copolymer can be present in amount of 0.5 –20 preferably 4.5 –15 wt.% of the vinyl chloride copolymer.

Again referring to Formula (I), $X_1$ and $X_2$ can be of the formula:

$$-S(CH_2)_{N1}CO_2(C_{N2}H_{N3})(OH)_{N4}$$

wherein
$C_{N2}H_{N3}$ is an aliphatic group;
N1 is 1
N2 is 2 to 16;
N3 is 4 to 32;
N4 is 1 to 2;
N3 + N4 = 2 times N2 + 1. Where the tin compound contains more than 1 tin atom, the formula can be:

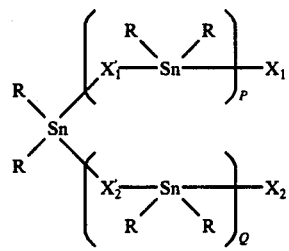

wherein:
each R represents alkyl of 1 to 22 carbon atoms, mononuclear aryl, or alkyl substituted aryl of 1 to 15 carbon atoms
$X'_1$ and $X'_2$ each represents

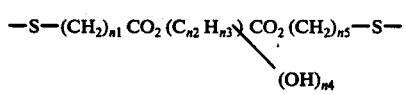
$$-S-(CH_2)_{n1}CO_2(C_{n2}H_{n3})CO_2(CH_2)_{n5}-S-$$
$$(OH)_{n4}$$

wherein
$C_{n2}H_{n3}$ is an aliphatic group;
n1 is 1 to
n2 is 7 to 13; n3 is 4 to 27;
n4 is 0 to 2;
n5 1
n3 + n4 times n2;
$X_1$ and $X_2$ each represents

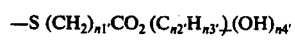
$$-S(CH_2)_{n1'}CO_2(C_{n2'}H_{n3'})(OH)_{n4'}$$

wherein
$C_{n2'}H_{n3'}$ is an aliphatic group;
n1' is 1
n2' is 2 to 16;
n3' is 4 to 32;
n4' is 1 to 2;
n3' + n4' = 2 times n2 + 1
with the proviso that $X_1$ and $X_2$ can be bonded together through carbon atoms of the alcohol residues to form a ring;
P is 0 to 5
Q is 1 to 5.

EXAMPLES FOR PURPOSES OF COMPARISON

1. Other substances acting as stabilizers for PVC, such as for example commercial Ba-Cd stabilizers or lead stabilizers do not bring about self-adherence.
   a. A PVC batch composed of vinyl chloride-propylene copolymer containing 4.5 wt-% propylene (VC/PP) was stabilized with 3 parts of barium-cadmium stabilizer soap (Ciba BC 96) and 1 part of decylphenylphosphite per 100 parts of polymer, and was made into powder in the manner described. Coatings produced with this powder showed an adhesion value of GT 4, that is, they did not exhibit any self-adhesion.
   b. The same VC/PP mixture was worked with 4 parts of a basic lead stearate as stabilizer. The coatings made from the powder produced from this material again showed an adhesion value of GT 4, that is, no self-adhesion.
2. When other tin stabilizers, such as for example three parts of dibutyl tin maleate, were used as additives to VC/PP mixtures no self-adhesion of the powder coating was achieved. The powder coatings made from these compositions showed an adhesion value of GT 4, that is, no self-adhesion.
3. If a conventional primer on the basis of an epoxidized acrylate, e.g., epoxidized polymethylmethacrylates (e.g., Gotekplast X 21 made by Lurgis of Frankfurt, or Collagent P made by Chem. Werke Kluthe of Heidelberg) is applied to the substrate in the manner described, good adhesion values are obtained for the PVC powder coatings described under 1a, 1b or 2, which do not adhere without the primer. Values of GT 0 are achieved on the basis of the criss-cross slashing method. This procedure suffers, of course, the disadvantages described and militates against the economical use of PVC powder coatings.

EXAMPLES

To demonstrate that, of the known organic tin compounds which are used, among others, for the stabilization of polyvinyl chloride, only alkyl and/or aryl tin bismercaptocarboxylic acid esters are effective in the sense of the invention, the following examples were performed:

1. In accordance with the preparation procedure already described, A VC-propylene copolymer (4.5 wt-% propylene, K value 48) was mixed with the additives conventionally used for a powder coating, plus 8 wt-% pigments and 2.5 parts of an organic tin compound of Fromula 2 with R = n-butyl, and coating powders were produced from this mixture. With this powder, steel plates size 150 × 60 × 1.5 mm were coated by the fluidized-bed process and steel plates size 150 × 80 × 0.8 mm were coated by the electrostatic powder coating process. In both cases the coating were self-adherent. In the case of the electrostatically coated plates criss-cross slash test ratings were obtained of GT 0, and in the case of the fluidized-bed coated plates the coating could not be removed with a knife in the test procedure described above. When VC-ethylene (4 wt-% ethylene, K value 48) and VC-butene copolymers as a resin basis, with otherwise the same formula, the same adhesion effect was obtained, with a rating of GT 0.

2. In like manner, test specimens were coated with a powder of polymers named in Example 1, containing 0.5 parts of a compound of Formula 2 in which R = i-butyl. The adhesion test showed self-adhesion on plates coated by both methods. Coatings based on VC-vinyl silane (5 wt-% vinyltriethoxysilane, K value 46) and VC-vinyl versatic ester (10 wt-% versatic ester, K value 48) and compounded in the same, also showed an improved self-adhesion.

3. When 5 parts of a compound of Formula 2 in which R is n-hexyl were used in a coating powder on a basis of VC-propylene copolymer (5.2 wt-% propylene, K value 42), the same effect was produced. The same test procedure showed the coatings has a self-adhesion equal to GT 0.

The substrates in this case were rolled steel sections, aluminum plates and glass bottles coated by the electrostatic fluidized-bed process.

If the VC-propylene copolymer was replaced with a VC-vinyl acetate copolymer (18% vinyl acetate, K value 52) or by a VC-vinyl/ether copolymer, the adhesion effect was produced in the same manner.

4. The same procedure as described in Examples 1 to 3 is followed, using the polymers produced therein, but a compound of Formula 2 with R = octyl is used as the adhesion-producing compound. In all cases self-adhesion of the powder coatings is produced.

5. When an organic tin compound of Formula 3 with R = butyl was used in the same manner as in Examples 1 and 3, with the polymers named therein, the powder coatings prepared from these mixtures and tested in the same manner as described exhibited self-adhesion. The same effect was produced when compounds of Formula 3 with R = octyl were used.

6. The procedure of Example 1 was followed, except that the organic tin compound of Formula 2 was replaced by 3 wt-% of a compound of formulas 1a to 1e, namely compounds in which both R were the butyl radicals in one case and the octyl radicals in the other for each compound, and n was equal to 2, m to 1 and p to 1. The powder coatings prepared on the basis of these formulas showed good adhesion.

7. The procedure of Example 1 was followed, but in each case 4 wt-% of the compounds listed under 1a to 1e were used, and n was equal to 2, m to 2 and p to 0; also, a total of 4 wt-% of mixtures of equal parts of these compounds and of mixtures in ratios of 1:2 and 2:1 of these compounds with those under Formula 3 in which R was n-butyl was used in every case. All these powder coatings exhibited strong self-adhesion.

8. The same procedure as in Examples 1 and 2 was followed. The compound of Formula 2, however, was replaced in each case by compounds of Formulas 1a to 1e with R = phenyl and n = 2, m = 1 and p = 1. The powder coatings this produced also were self-adherent.

9. The procedure was the same as in Example 1, but the steel plates were replaced by plates of iron and of aluminum alloys. Self-adhesion to these substrates was determined by the appropriate testing procedures.

10. The coating powder (100 parts) was produced from 83 parts of a copolymer of vinyl chloride and propylene with a propylene content of 4.5% and a K value of 48, which contained 5 parts of weight of a copolymer (trademark, Levapren 450) from ethylene and vinyl acetate (vinyl acetate content 45 wt.%), 8 parts by weight of $TiO_2$ as pigment and 4 parts by weight of dialkyl tin dithioglycolic acid ester of 1,4-butane-diol, whose alkyl groups have the chain lengths $C_4$ to $C_8$, (trademark: 15 MO of the company Ciba-Geigy). The powder was mixed with a free fall mixer and afterwards homogenized and plasticized on an extruder, then granulated and ground, as well as sieved to form the particle sizes set forth below.

Sample I Coating in accordance with the fluidized sintering process.

A sieve powder of the particle size 60 to 250 μm was applied to an iron sheet degreased with 1,1,1-trichloroethane, preheated at 380° C for 2 minutes, at an immersion time of 4 seconds in the fluidized bed. The coating thickness of the molten layer amounts to 260 to 300 μm; the coating is closed and pore-free and exhibits an excellent self-adhesion to the iron as shown by the knife test.

Sample II Coating in accordance with the electrostatic powder coating process.

A sieved powder of the above recipe with particle sizes of below 100 μm in the range of 40 to 100 μm was sprayed electrostatically onto a hanging sheet of iron degreased with 1,1,1-trichloroethane, with a Ransburg-coating apparatus at a voltage of 80 KV, and afterwards baked for 11 minutes at a baking temperature of 200° C. The coating thickness of the molten layer is 90 to 110 μm; the coating is closed and pore-free and exhibits an excellent self-adhesion to the iron of GT O.

The vinyl chloride residues ($-CH_2CHCl-$) in the preferred propylene copolymers can be 99-85, preferably 97.5-94, wt.% of the copolymer.

An article according to the invention is depicted in the accompanying drawing which is self-explanatory.

Percentages herein are in wt.%, unless otherwise indicated; parts referred to weight parts on the basis of 100 parts. The symbol "μm" means microns. The alkyl and/or aryl tin bismercaptocarboxylic acid esters of formular (I) hereof can advantageously be used in combination with the pvc copolymers of copending application Ser. No. 441,786, filed Feb. 12, 1974 assigned to the assignee hereof, which is incorporated herein by reference.

The tin compounds used are known and commercially available. Some of them are mixtures i.g. of compounds with different chain length in the polyvalent alcohol group. While it is easy to analyze the compounds and to determine the rests bound to the tin atom and to write a formula, there are some difficulties in naming the compounds because the lack of a nomenclature used by all experts. Therefore in the specification and in the examples there are used no names for the compounds and they are only indicated by naming the rests or ligands connected to tin. Nevertheless in the following some names are noted according our understanding. In Example 1 the compounds of formula 2, with R = n-butyl can be named as di-n-butyl tin di thioglycolic acid glycol ester. Though there are two ester groups connected with tin by the sulfur atoms of each thioglycolic acid rest and though of the ethylene glycol rests only one of the OH groups is esterified, this is not clearly expressed in the name and only by the formula do all these facts become clear. Even more difficult is the naming of the substances of formulae 3) or 1 d) or 1 e) in which the two ester ligands are connected to each other by a common group of a diol or polyol. These ligands are radicals of a glycol which both OH groups are esterified each with a mercapto carboxylic acid and both S of the mercapto acids are connected to the same tin atom. In our understanding the name of the compound of the formula 3 in example 3 may be di-n-hexyl tin (di thio glycolic acid) ethylene glycol diester. In similar manner compounds of formula III which sometimes are present in commercial products in mixture with those of the formula II i.e., if the ligands 1 d or 1 e are present, only can determined by the formula.

To explain further example 6 the used tin compounds are listed below:

$R_1$ and $R_2$ each represents alkyl of 1 to 22 carbon atoms, mononuclear aryl, or alkyl substituted mononuclear aryl of 6 to 15 carbon atoms, $X_1$ and $X_2$ each represents an S— residue of a thiocarboxylic acid ester of a polyvalent alcohol, with each $X_1$ and $X_2$ being bonded to the tin atom through the S atom thereof, with the proviso that $X_1$ and $X_2$ can be bonded together through carbon atoms of the alcohol residues to form a ring.

5. Process according to claim 4, wherein each $X_1$ and $X_2$ is of the formula:

| Ex. | $R_1 = R_2$ | formula | $X_1 ; X_2$ | | |
|---|---|---|---|---|---|
| 6.1 | = n-butyl | 1 a | $X_1 = X_2$ | n = 2 | $-S-CH_2-CO_2-(CH_2)_2-OH$ |
| 6.2 | " | 1 b | $X_1 = X_2$ | m = p = 1 | * |
| 6.3 | " | 1 c | $X_1 = X_2$ | m = p = 1 | ** |
| 6.4 | " | 1 d | $X_1\frown X_2$ | n = 2 | *** |
| 6.5 | " | 1 e | $X_1\frown X_2$ | $m_1 = m_2 = 1$ | **** |
| 6.6 | = n-octyl | 1 a | | like 6.1 | |
| 6.7 | " | 1 b | | like 6.2 | |
| 6.8 | " | 1 c | | like 6.3 | |
| 6.9 | " | 1 d | | like 6.4 | |
| 6.10 | " | 1 e | | like 6.5 | |

\*    $-S-CH_2-CO_2-CH_2-CH(OH)-CH_2-CH_3$
\*\*   $-S-CH_2-CO_2-CH_2-CH(OH)-CH_2-CH_2OH$
\*\*\*

$-S-CH_2-CO_2\diagdown$
               $(CH_2)_2$
$-S-CH_2-CO_2\diagup$

\*\*\*\*

$-S-CH_2-CO_2-CH_2\diagdown$
                     CHOH
$-S-CH_2-CO_2-CH_2\diagup$

What is claimed is:

1. Process of producing an article coated with a vinyl chloride polymer which comprises depositing a powder directly on the surface of a substrate which is a body portion of the article, and which is free of adhesivizing agent and forming a coating film of the surface of the substrate by melting the powder thereon, and hardening the film to form said coated article, said powder being a composition comprising a copolymer of vinyl chloride admixed with monoalkylmonoaryl, dialkyl, or diaryl tin bismercaptocarboxylic acid ester of polyvalent alcohol in an amount sufficient to improve adhesion of the copolymer to the substrate and provide a self-adherent coating, said composition being free of plasticizer.

2. Process according to claim 1, wherein the tin compound is present in amount of up to about 5 wt.% based on the copolymer.

3. Process according to claim 1, wherein the substrate is metal, glass, or ceramic.

4. Process according to claim 1, the tin compound being of the formula:

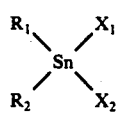

wherein:

$-S(CH_2)_{n1}CO_2(C_{n2}H_{n3})(OH)_{n4}$ wherein
$C_{n2}H_{n3}$ is an aliphatic group;
$n1$ is 1;
$n2$ is 2 to 16;
$n3$ is 4 to 32;
$n4$ is 1 to 2;
$n3 + n4 = 2$ times $n2 + 1$.

6. Process according to claim 1, the tin compound being of the formula:

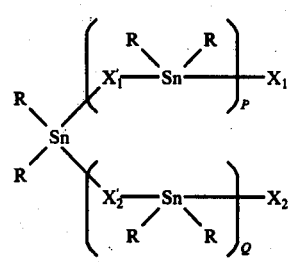

wherein:
each R represents alkyl of 1 to 22 carbon atoms, mononuclear aryl, or alkyl substituted aryl of 1 to 15 carbon atoms
$X'_1$ and $X'_2$ each represents

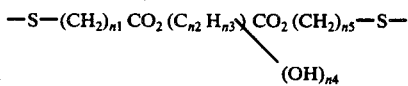

wherein
$C_{n2}H_{n3}$ is an aliphatic group;
$n1$ is 1;
$n2$ is 2 to 13;
$n3$ is 4 to 27;
$n4$ is 0 to 2;
$n5$ is 1;
$n3 + n4 = 2$ times $n2$;
$X_1$ and $X_2$ each respresents
— $S(CH_2)_{n1'} CO_2(C_{n2'}H_{n3'}-(OH)_{n4'}$ wherein
$C_{n2'}H_{n3'}$ is an aliphatic group;
$n1'$ is 1;
$n2'$ is 2 to 16;
$n3'$ is 4 to 32;
$n4'$ is 1 to 2;
$n3' + n4' = 2$ times $n2 + 1$ with the proviso that $X_1$ and $X_2$ can be bonded together through carbon atoms of the alcohol residues to form a ring;
P is 0 to 5
Q is 1 to 5.

7. Process according to claim 1, the tin compound being:

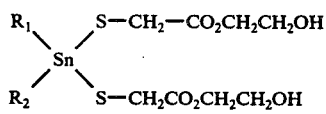

wherein
$R_1$ and $R_2$ each represents
alkyl of 1 to 22 carbon atoms,
aryl or mononuclear alkyl substituted
aryl of 1 to 15 carbon atoms.

8. Process according to claim 7, wherein $R_1$ and $R_2$ is each alkyl of 4 to 8 carbon atoms.

9. Process according to claim 8, wherein $R_1$ and $R_2$ is each n-butyl.

10. Process according to claim 1, the tin compound being:

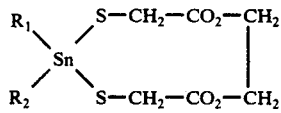

wherein
$R_1$ and $R_2$ each represents
alkyl of 1 to 22 carbon atoms,
aryl or mononuclear alkyl substituted
aryl of 1 to 15 carbon atoms.

11. Process according to claim 10, wherein $R_1$ and $R_2$ is each alkyl of 4 to 8 carbon atoms.

12. Process according to claim 10, wherein $R_1$ and $R_2$ is each n-butyl.

13. Process according to claim 1, the copolymer being of vinyl chloride and other monomer, the vinyl chloride residues being 99 to 70 wt.% of the copolymer.

14. Process according to claim 1, the copolymer being of vinyl chloride and other monomer, the vinyl chloride residues being 97.5 to 94 wt.% of the copolymer.

15. Process according to claim 1, the copolymer being of vinyl chloride and at least one of alkylene monomer, vinylsilane monomer, vinyl alkyl ether monomer, vinylversatic ester monomer, and vinyl aliphatic carboxylic acid monomer.

16. Process according to claim 1, the copolymer being vinyl chloride and at least one of ethylene, propylene, butene, vinylethylether, and vinylacetate.

17. Process according to claim 1, characterized in that the powder is applied by fluidized bed sintering or by electrostatic powder coating.

18. Process according to claim 1, the mercaptocarboxylic acid be thioglycolic acid.

19. Process according to claim 1, the copolymer being of vinyl chloride and propylene, the vinyl chloride residues being 85 – 96 wt.% of the copolymer.

20. Process according to claim 1, wherein the copolymer is of vinyl chloride and propylene.

21. Process according to claim 2, wherein the copolymer is of vinyl chloride and propylene.

22. Process of claim 8, wherein the copolymer is of vinyl chloride and propylene.

23. Process of claim 22 wherein the vinyl chloride residues are 97.5 to 94 wt.% of the polymer, and the tin compound is present in an amount of up to 5 wt.% based on the copolymer.

24. Process of claim 9, wherein the copolymer is of vinyl chloride and propylene.

25. Process of claim 24 wherein the vinyl chloride resides being 97.5 to 94 wt.% of the polymer, and the tin compound is present in an amount of up to 5 wt.% based on the copolymer.

* * * * *

UNITED STATES PATENT AND TRADEMARK OFFICE
CERTIFICATE OF CORRECTION

PATENT NO. : 4,053,659
DATED : October 11, 1977
INVENTOR(S) : Peter Gebauer and Peter Unrath It is certified that error appears in the above-identified patent and that said Letters Patent are hereby corrected as shown below:

Title Page, Inventors, change "Trotsdorf" to --Troisdorf--.

Title Page, Foreign priority, change "2308202" to --2308020--.

Column 1, line 15, insert "additional" before "operations".

Column 2, line 22, change "$(R_2R_2...)_9$" to --$(R_1R_2...)_q$--.

Column 2, line 27, change "9" to --q--.

Column 2, lines 57,58, change " Sn X" to --$\widehat{Sn\ X}$--.

Column 4, line 35, change "time" to --tin--.

Column 4, line 44, insert "m" after "µ".

Column 4, line 47, insert ";" after "µm".

Column 4, line 51, change "monoculear" to --mononuclear--.

Column 5, line 7, insert "each" before "be".

Column 5, line 47, change "n1 is 1 to" to --n1 is 1--.

Column 5, line 50, change "n5 1" to --n5 is 1--.

UNITED STATES PATENT AND TRADEMARK OFFICE
CERTIFICATE OF CORRECTION

PATENT NO. : 4,053,659
DATED : October 11, 1977
INVENTOR(S) : Peter Gebauer and Peter Unrath It is certified that error appears in the above-identified patent and that said Letters Patent are hereby corrected as shown below:

Column 5, line 51, change "n3 + n4 times n2" to --n3 + n4 =2 times n2;--.

Column 6, line 47, change "A VC..." to --a VC...--.

Column 7, line 37, change "R" to --R's--.

Column 12, line 51, change "resides" to --residues--.

Signed and Sealed this

Eleventh Day of April 1978

[SEAL]

Attest:

RUTH C. MASON
Attesting Officer

LUTRELLE F. PARKER
Acting Commissioner of Patents and Trademarks